(12) United States Patent
Kadam et al.

(10) Patent No.: US 10,801,452 B2
(45) Date of Patent: Oct. 13, 2020

(54) FILTER SHELLS WITH MOUNTED HEATERS

(71) Applicant: CUMMINS FILTRATION IP, INC., Columbus, IN (US)

(72) Inventors: Pravin Shantinath Kadam, Kolhapur (IN); Yiyun Zhang, Shanghai (CN); Meng Zeng, Wuhan (CN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 33 days.

(21) Appl. No.: 16/081,178

(22) PCT Filed: Mar. 3, 2017

(86) PCT No.: PCT/IB2017/051263
§ 371 (c)(1),
(2) Date: Aug. 30, 2018

(87) PCT Pub. No.: WO2017/153879
PCT Pub. Date: Sep. 14, 2017

(65) Prior Publication Data
US 2019/0085803 A1  Mar. 21, 2019

(30) Foreign Application Priority Data
Mar. 7, 2016 (CN) .................... 2016 2 0172460 U

(51) Int. Cl.
*F02M 31/125* (2006.01)
*B01D 35/18* (2006.01)
*F02M 37/30* (2019.01)
*F02M 37/32* (2019.01)
*B01D 35/00* (2006.01)

(52) U.S. Cl.
CPC .......... *F02M 37/30* (2019.01); *B01D 35/005* (2013.01); *B01D 35/18* (2013.01); *F02M 31/125* (2013.01); *F02M 37/32* (2019.01); *B01D 2201/4053* (2013.01); *B01D 2201/54* (2013.01); *Y02T 10/126* (2013.01)

(58) Field of Classification Search
CPC ...... F02M 37/30; F02M 37/32; F02M 31/125; B01D 35/18; B01D 35/005
See application file for complete search history.

(56) References Cited

U.S. PATENT DOCUMENTS 4,580,542 A    4/1986  Kawabata
4,836,923 A *  6/1989  Popoff .................. B01D 35/18
                                              210/232

(Continued)

OTHER PUBLICATIONS

International Search Report and Written Opinion issued for PCT/IB2017/051263, dated Jun. 6, 2017, 17 pages.

*Primary Examiner* — Jacob M Amick
(74) *Attorney, Agent, or Firm* — Foley & Lardner LLP

(57) ABSTRACT

A heated filter shell assembly for a fuel filtration system includes a filter shell defining a cavity sized to accommodate at least a portion of a fluid filtration cartridge and a cartridge receiving aperture at a first end. A heating element is disposed within the cavity and is operatively coupled to the filter shell adjacent to a second end of the filter shell. A feed wire is operatively coupled to the heating element at a feed wire first end and is configured for electrical energy receiving communication with an energy source at a feed wire second end.

36 Claims, 3 Drawing Sheets

(56) References Cited

U.S. PATENT DOCUMENTS

| | | |
|---|---|---|
| 5,547,565 A | 8/1996 | Biere et al. |
| 5,753,111 A | 5/1998 | Patton et al. |
| 6,353,708 B1 | 3/2002 | Reusche et al. |
| 2012/0160749 A1* | 6/2012 | Girondi ............... B01D 35/18 210/149 |
| 2013/0146032 A1 | 6/2013 | Zhou et al. |

* cited by examiner

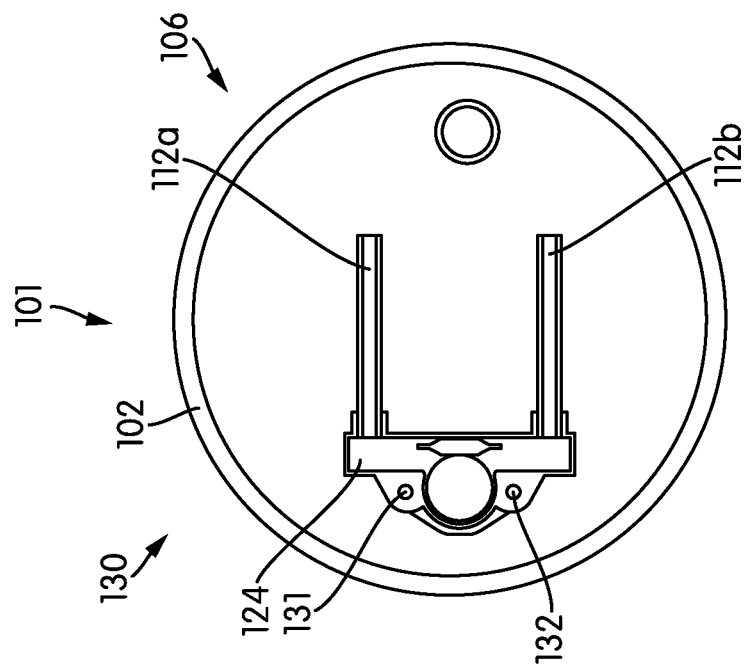
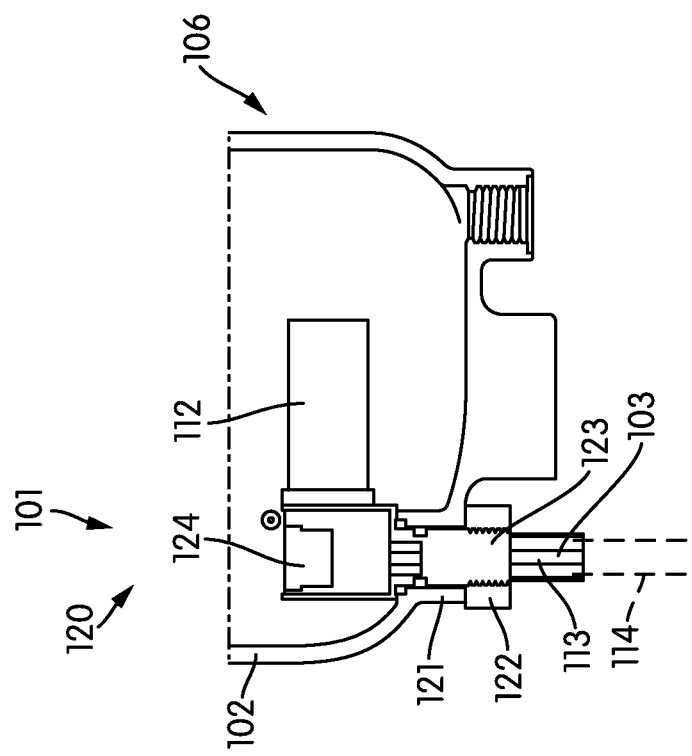
FIG. 1D
FIG. 1C

US 10,801,452 B2

FILTER SHELLS WITH MOUNTED HEATERS

CROSS REFERENCE TO RELATED APPLICATIONS

This application is a National Stage of PCT Application No. PCT/IB2017/051263 filed Mar. 3, 2017, which claims priority to Chinese Utility Model Application No. 20160172460.7, entitled "FILTER SHELLS WITH MOUNTED HEATERS" filed Mar. 7, 2016, which issued as Chinese Utility Model No, ZL2016201724607 on Dec. 14, 2016. The contents of both applications are incorporated herein by reference in their entirety and for all purposes.

TECHNICAL FIELD

The present disclosure relates to fluid filtration systems for internal combustion engines.

BACKGROUND

In various conventional fluid filtration systems, heat is applied to a flow of fluid passing through a filtration cartridge. The filtration cartridge may be disposed within a shell housing that in turn is coupled to a fluid filtration system. As such, fuel from a fuel reservoir may flow to the fluid filtration system, down and through the filtration cartridge in the shell, up and out of the filtration cartridge, and on to an internal combustion engine for ignition. Heat may be used to facilitate various processes relating to a given type of fluid. For example, heat may be used to facilitate removal of water from fuel flowing through the fuel filtration system. Additionally, in cold temperature applications, the low temperature of fuel in the fuel reservoir may lead to the formation of wax and cause ice to accumulate at bottom of the shell, thereby increasing fuel restriction. This restriction may be reduced by heating the fuel.

SUMMARY

One embodiment relates a heated filter shell assembly for a fuel filtration system. The assembly includes a filter shell defining a cavity sized to accommodate at least a portion of a fluid filtration cartridge and a cartridge receiving aperture at a first end. The assembly further includes a heating element disposed within the cavity and operatively coupled to the filter shell adjacent to a second end of the filter shell. The assembly includes a feed wire operatively coupled to the heating element at a feed wire first end and configured for electrical energy receiving communication with an energy source at a feed wire second end.

Another embodiment relates to an internal combustion assembly. The assembly includes a fuel reservoir configured to store a quantity of fuel. The assembly further includes a fuel filtration system in fluid receiving communication with the fuel reservoir. The system includes a fuel filtration cartridge. The system further includes a filter shell defining a cavity sized to accommodate at least a portion of the fuel filtration cartridge and a cartridge receiving aperture at a first end. The system includes a heating element disposed within the cavity and operatively coupled to the filter shell adjacent to a second end of the filter shell. The system further includes a feed wire operatively coupled to the heating element at a feed wire first end and configured for electrical energy receiving communication with an energy source at a feed wire second end. The assembly includes an internal combustion engine in fluid receiving communication with the fuel filtration system.

Yet another embodiment relates to a fuel filtration system in fluid communication with a fuel reservoir. The system includes a fuel filtration cartridge and a filter shell defining a cavity sized to accommodate at least a portion of the fuel filtration cartridge and a cartridge receiving aperture at a first end. The system further includes a heating element disposed within the cavity and operatively coupled to the filter shell adjacent to a second end of the filter shell. The system includes a feed wire operatively coupled to the heating element at a feed wire first end and configured for electrical energy receiving communication with an energy source at a feed wire second end.

A further embodiment relates to a method. The method includes providing a filter shell. The filter shell defining a cavity sized to accommodate at least a portion of a filtration cartridge. The method further includes securing a feed wire to the filter shell. The feed wire passes through an aperture in the filter shell. The method includes connecting an electronics package to a first end of the feed wire. The method further includes connecting a heating element to the electronics package, wherein the heating element is positioned in the cavity of the filter shell. The method includes installing the filtration cartridge in the cavity.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIG. 1C shows a cross-sectional side view of a bottom portion of the heated filter shell assembly of FIG. 1A.

FIG. 1D shows a cross-sectional top-down view of the bottom portion of the heated filter shell assembly of FIG. 1A.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive heated fluid filter shells for internal combustion engines. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1B:
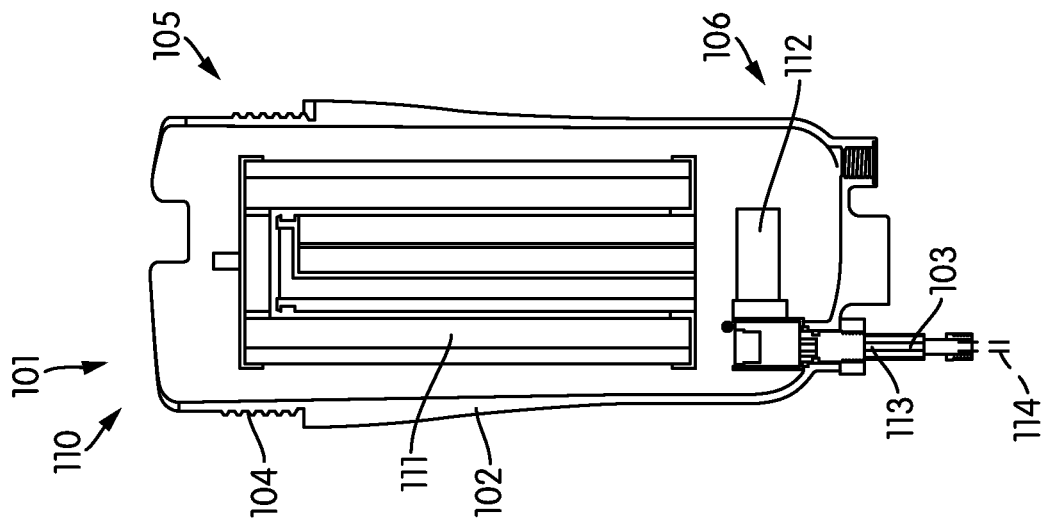
FIG. 1B shows a cross-sectional side view of the heated filter shell assembly of FIG. 1A.
Figure 1A:
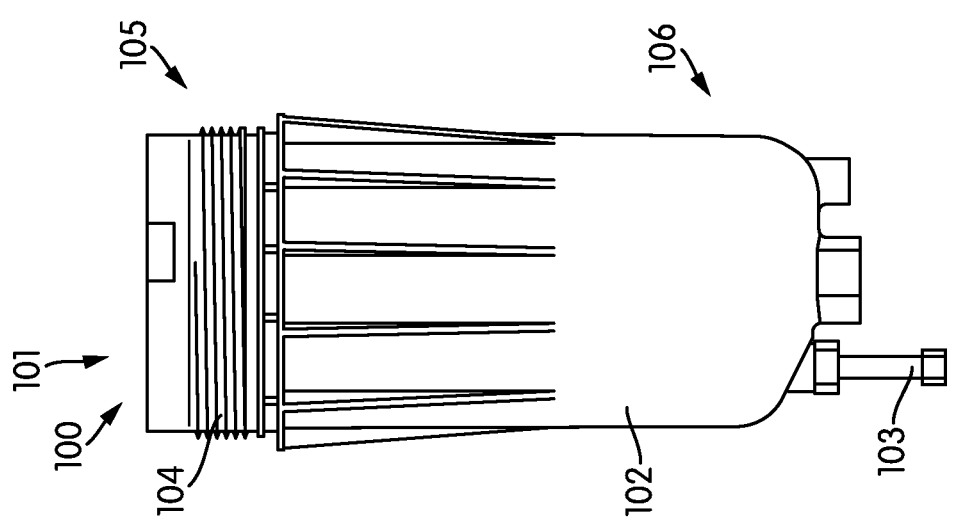
FIG. 1A shows an external side view of a heated filter shell assembly, according to an example embodiment.

Referring to FIGS. 1A and 1B, a first view 100 shows an exterior view of a heated filter shell assembly 101, and a second view 110 shows a cross-sectional view of the heated filter shell assembly 101. The heated filter shell assembly 101 includes a filter shell 102, which comprises a protective housing defining a cartridge receiving aperture at an open top end 105 leading to a corresponding cavity into which a fluid filtration cartridge 111 may be disposed. The filter shell 102 may be made up of any of various types of heat resistant materials. The particular material to be used may also be selected for resistance to fluid-related damage such as corrosion or rust (e.g., plastics, stainless steel, rubber coated materials, etc.). The filter shell 102 includes a coupling portion 104 at the open top end 105 (e.g., annular threads) and a feed wire 103 disposed through an aperture at a corresponding closed bottom end 106.

The filtration cartridge 111 may be used to filter and remove particulate and other undesirable types of matter from a fluid used by an associated internal combustion engine. The filtration cartridge 111 may include filtration media, for example, paper-based filter media, fiber-based filter media, foam-based filter media, and so on. In some arrangements, the filtration cartridge 111 may be used to filter particulate debris from diesel or gasoline. In some such arrangements, the filtration cartridge 111 may be disposed in fuel exchanging communication with a fuel system of an internal combustion engine via a fuel filtration system, such that fuel from a reservoir (e.g., a fuel tank housing unleaded or diesel fuel) is routed to and through the filtration cartridge 111 within the filter shell 102 before being received at one or more combustion chambers (e.g., cylinders of the internal combustion engine) for ignition.

The coupling portion 104 includes one or more coupling features adjacent to the cartridge aperture that are configured to removably engage complementary features (e.g., threading, clips, clamps, etc.) of a cap or a mounting portion of an associated fluid filtration system. In operation, the filtration cartridge 111 may be disposed through the cartridge aperture and into the cavity of the filter shell 102, and the filter shell 102 may then be coupled to a cap or a mounting position of a filtration system via the coupling portion 104 (e.g., rotating the filter shell 102 to engage complementary threads at the coupling portion 104 and the cap or mounting portion).

The feed wire 103 is communicatively coupled to a heating element 112 at a feed wire first end 113 and an energy source (e.g., a battery) at a feed wire second end 114. The heating element 112 is disposed within the cavity towards the bottom end 106 of the filter shell 102, and is configured to convert electrical energy into thermal energy. The heating element 112 may be formed of any of a variety of heat conducting materials, including various metals and alloys thereof. The heating element 112 may be structured in various ways, for example as one or more panels, rods, coils, rings, etc. In some arrangements, the heating element 112 includes a positive temperature coefficient heater. When assembled, the filtration cartridge 111 is disposed above the heating element 112 within the cavity of the filter shell 102. In operation, electrical energy provided by the energy source is communicated to the heating element 112 via the feed wire 103, where the electrical energy is converted to thermal energy. The heating element 112 communicates thermal energy to the filtration cartridge 111 within the filter shell 102 (e.g., via convection), thereby increasing the temperature of the filtration cartridge 111 and any fluid contained therein. Heated fluid within the filtration cartridge 111 may begin to circulate as a result of the application of heat, as higher temperature fluid rises within the filtration cartridge 111 and lower temperature falls within the filtration cartridge 111.

Referring to FIG. 1C, a third view 120 is a cross-sectional side view of the bottom end 106 of the heated filter shell assembly 101. The filter shell 102 may further define a feed aperture 121 through which a portion of the of the feed wire 103 may be disposed. In some arrangements, a proximal segment (i.e., toward the feed wire first end 113) of the feed wire 103 includes a locking portion 123. The locking portion 123 includes physical features configured to engage complementary features of a corresponding locking fastener 122 to secure the position of the heating element 112 within the filter shell 102. In some arrangements, the locking portion 123 and the locking fastener 122 include a permanent fastener configured to permanently engage one another (e.g., where the locking portion 123 includes a set of threads and the locking fastener 122 is a locking nut). In other arrangements, the locking fastener 122 is removable from the locking portion 123 (e.g., the locking fastener 122 may comprise a nut and bolt, respectively).

In some arrangements, the heating element 112 and the feed wire 103 are coupled to an electronics package 124 within the cavity of the filter shell 102. The electronics package 124 may include a housing for a processor and non-transient computer-readable media that together provide a circuit configured to perform operations that include regulating temperature within the filter shell 102. The electronics package 124 may be configured to selectively provide the heating element 112 with energy received from the feed wire 103 to cause the heating element 112 to distribute thermal energy within the cavity of the filter shell 102. In various arrangements, the electronics package 124 may include a temperature sensor configured to detect temperature conditions within the filter shell 102. In such arrangements, the electronics package 124 may adjust the thermal output of the heating element 112 based on temperature data received from the temperature sensor. As such, the electronics package 124 may be able to use the temperature sensor and the heating element 112 to maintain the temperature within the filter shell 102 within desired ranges, despite fluctuations in fluid flow volume and/or rate through the filtration cartridge 111. In other arrangements, the output of the heating element 112 may be regulated by a computing device that is external from the filter shell 102 (e.g., an engine control unit or other central controller on an associated vehicle).

FIG. 1D includes a fourth view 130 showing a top-down cross-sectional view of the bottom end 106 of the heated filter shell assembly 101. As shown, the heating element 112 includes a first element 112a and a second element 112b extending from the electronics package 124, which in turn is disposed off-center to a side of the bottom end 106 of the filter shell 102. The electronics package 124 may be formed to position each heating element 112a, 112b to be parallel to each other and extend from opposite ends of the electronics package 124. The electronics package 124 may further position each heating element 112a, 112b to be at or near the center point of the bottom end 106 of the filter shell 102. In some such arrangements, the heating elements 112a, 112b are disposed on either side of and equidistant to a center point of the bottom end 106 of the filter shell 102. As such, heat produced from the elements 112a, 112b may be distributed evenly or close to evenly across the bottom end 106 of the filter shell 102.

In some arrangements, a first pin 131 and a second pin 132 may be used to position and secure the electronics package 124 during assembly. The pins 131, 132 are coupling features configured to couple the housing of the electronics package to the filter shell 102 at a location that disposes the heating elements 112a, 112b at desired locations in the cavity of the filter shell 102. In some arrangements, each of the pins 131, 132 comprises a rod extension disposed through the electronics package 124 and into the filter shell 102. As such, the pins 131, 132 may keep the electronics package 124 and the heating elements 112a, 112b in position while the locking fastener 122 is coupled to the locking portion 123. For example, where the locking fastener 122 is a nut and the locking portion 123 includes threads, the pins 131, 132 may allow the electronics package 124 to resist twisting movements communicated by the rotation and tightening of the nut on the threads.

In operation, the heated filter shell assembly 101 is assembled to position the heating elements 112a, 112b at a position below the filtration cartridge 111 within the shell 102. In one arrangement, the electronics package 124 may be pre-coupled to the heating elements 112a, 112b and the feed wire 103. The feed wire second end 114 may be threaded into the open top end 105 of the shell 102, into the cavity, and out the feed aperture 121 at the bottom end 106 of the shell 102. The feed wire 103 may be pulled through the feed aperture 121 until the electronics package 124 at the proximal end of the feed wire 103 is positioned at the bottom end 106 of the shell 102. In another arrangement, the feed wire 103 is initially uncoupled from the electronics package 124. The feed wire first end 113 may be threaded into the cavity through the feed aperture 121 at the bottom end 106 of the shell 102. The electronics package 124 and the heating elements 112a, 112b may be disposed into the open top end 105 of the shell 102, into the cavity, and then coupled to the feed wire first end 113. The electronics package 124 may then be positioned in the bottom end 106 of the shell 102.

Once the electronics package 124 is positioned in the bottom end 106 of the shell 102, pins 131, 132 may be used to secure the electronics package 124 in position. The pins 131, 132 may be disposed through a housing portion of the electronics package 124 and into the shell 102. The locking fastener 122 may then be coupled to the locking portion 123 of the feed wire 103 to permanently or removably secure the electronics package 124 in place. The filtration cartridge 111 may then be inserted into the open top end 105 of the shell 102 and disposed at a position above the heating elements 112a, 112b.

The shell 102 may then be coupled to a cap or a mounting position of the associated filtration system via the coupling portion 104. In operation, and in accordance with one arrangement, fuel from a fuel reservoir may flow into the filtration cartridge 111, where particulate and other undesirable matter is removed. While disposed in the filtration cartridge, fuel is also exposed to thermal energy provided by the heating elements 112a, 112b, and as such, the temperature of the fuel is increased. In various arrangements, the fuel may be heated to facilitate removal of water from the fuel, and/or to facilitate subsequent combustion at an associated internal combustion engine. Heated and filtered fuel then flows out of the filtration cartridge 111 and downstream towards the internal combustion engine.

Figure 2:
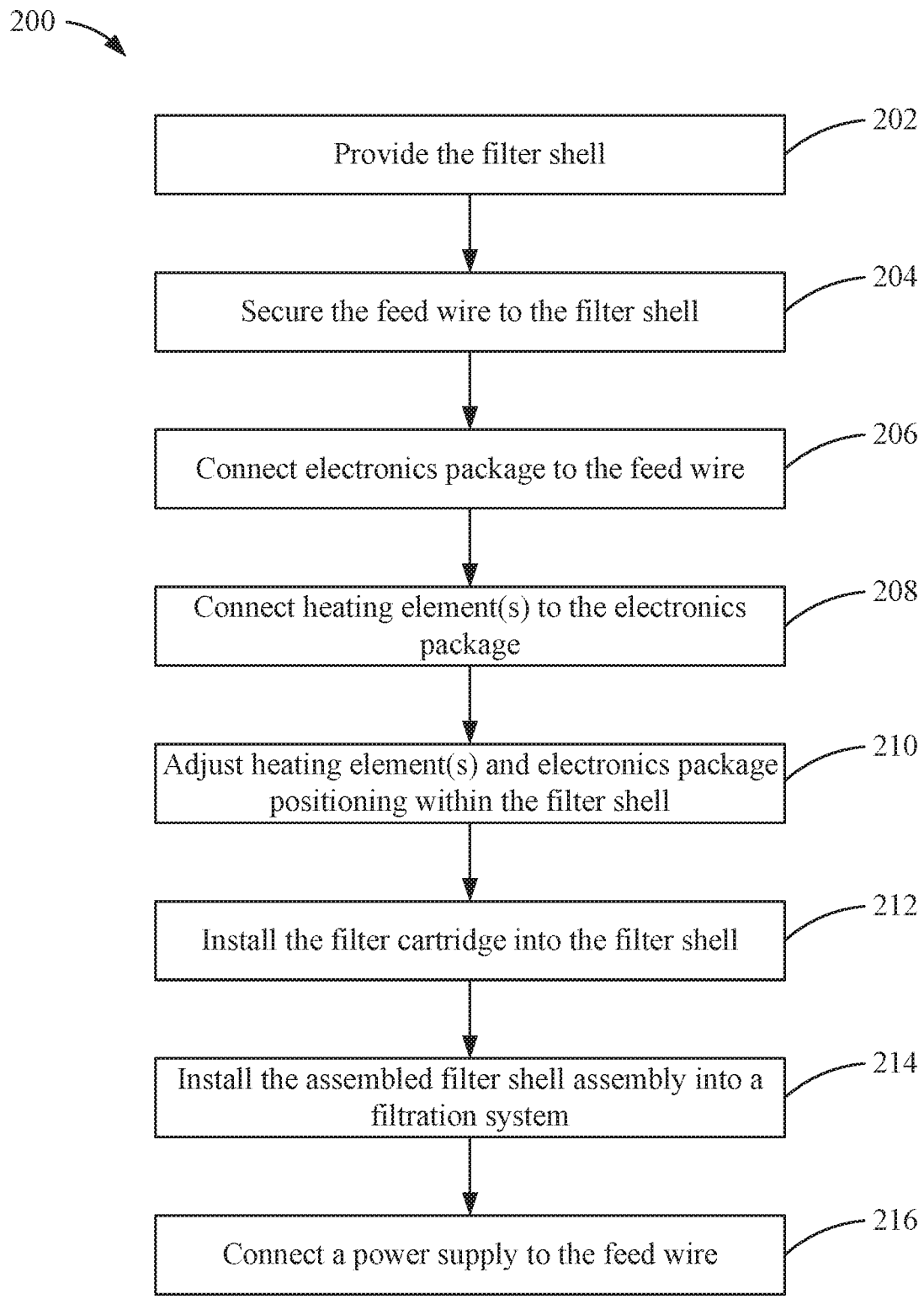
FIG. 2 shows a flow diagram of a method of assembling and installing a filtration cartridge having a heating element according to an example embodiment.

Referring to FIG. 2, a flow diagram of a method 200 of assembling and installing the filter shell assembly 101 is shown according to an example embodiment. The method 200 begins when the filter shell 102 is provided at 202. The feed wire 103 is secured to the filter shell 102 at 204. The feed wire 103 is secured to the filter shell 102 such that the feed wire 103 extends from the exterior of the filter shell 102, through the feed aperture 121 in the closed bottom end 106 of the filter shell 102, and into a central compartment within the filter shell 102. The feed wire 103 may be secured to the filter shell 102 with a locking fastener 122 that engages a locking portion 123 of the feed wire 103 (e.g., through meshing threads). The electronics package 124 is connected to the feed wire 103 at 206. The electronics package 124 is communicatively coupled to the feed wire first end 113. In some arrangements, the electronics package 124 is preprogrammed to control the heating element 112 during filtration operation. In other arrangements, the electronics package 124 is programmed after connecting the electronics package 124 to the feed wire 103. The heating element(s) 112 are connected to the electronics package 124 at 208. In some arrangements, the heating element 112 includes a single heating element or a plurality of heating elements. The heating element is configured to convert electrical energy received from the electronics package 124 (via the feed wire) into thermal energy. The heating element(s) 112 and the electronics package 124 are adjusted to a proper position within the filter shell 102 at 210. The electronics package 124 may be adjusted along the pins 131 and 132 to position the heating element 112 in the appropriate position within the filter shell 102. The filter cartridge 111 is installed into the filter shell 102 at 212. The filter cartridge 111 is positioned into the central compartment within the filter shell 102 through the open top end 105.

After the filter cartridge is positioned into the central compartment within the filter shell 102, the filter shell assembly 101 is assembled. The assembled filter shell assembly 101 is installed onto a filtration system at 214. The filter shell assembly 101 is secured to the filtration system through the coupling portion 104 of the filter shell 102 (e.g., through a threaded connection). In some arrangements, a cap is fitted over the open top end 105 prior to securing the filter shell assembly 101 to the filtration system. The feed wire 103 is connected to a power supply at 216. The feed wire second end 114, which is exposed on an exterior of the filter shell 102, is connected to a power source, such as a battery or power system associated with the filtration system. Fluid, such as fuel (e.g., gasoline, diesel, etc.), lubricant, hydraulic fluid, or the like, can then be filtered through the filtration system and through the filter cartridge within the filter shell assembly 101. As the fluid is filtered through the filtration system, the heating element 112 selectively applies heat to the fluid as it passes through the filter shell assembly 101.

For the purpose of this disclosure, the terms "coupled" and "engaged" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A heated filter shell assembly for a fuel filtration system, the heated filter shell assembly comprising:
    a filter shell defining a cavity configured to receive at least a portion of a fluid filtration cartridge and a cartridge receiving aperture at a first end;
    a heating element disposed within the cavity and operatively coupled to a bottom end of the filter shell adjacent to a second end of the filter shell;
    a feed wire operatively coupled to the heating element at a feed wire first end and configured for electrical energy receiving communication with an energy source at a feed wire second end;
    a locking fastener engaged to a locking portion disposed toward the feed wire first end, wherein the engagement of the locking fastener to the locking portion secures the coupling of the heating element to the filter shell; and
    at least one pin operatively coupling the heating element to the filter shell, the at least one pin positioning the heating element in the filter shell prior to the engagement of the locking fastener to the locking portion,
    wherein the bottom end of the filter shell is between the fluid filtration cartridge and the heating element when the portion of the fluid filtration cartridge is received within the cavity.

2. The heated filter shell assembly of claim 1, wherein the heating element comprises a plurality of heating elements.

3. The heated filter shell assembly of claim 1, wherein the heating element is disposed adjacent to a center point at the second end of the filter shell.

4. The heated filter shell assembly of claim 1, wherein the locking fastener comprises a permanent fastener.

5. A heated filter shell assembly for a fuel filtration system, the heated filter shell assembly comprising:
    a filter shell defining a cavity sized to accommodate at least a portion of a fluid filtration cartridge and a cartridge receiving aperture at a first end;
    a heating element disposed within the cavity and operatively coupled to the filter shell adjacent to a second end of the filter shell;
    a feed wire operatively coupled to the heating element at a feed wire first end and configured for electrical energy receiving communication with an energy source at a feed wire second end;
    a locking fastener engaged to a locking portion disposed toward the feed wire first end, wherein the engagement of the locking fastener to the locking portion secures the coupling of the heating element to the filter shell; and
    at least one pin operatively coupling the heating element to the filter shell, the at least one pin positioning the heating element at a central position in the filter shell prior to the engagement of the locking fastener to the locking portion,
    wherein the fluid filtration cartridge is positioned above the heating element within the cavity.

6. The heated filter shell assembly of claim 1, wherein thermal output of the heating element is regulated by a central controller of an associated internal combustion engine.

7. The heated filter shell assembly of claim 6, further comprising a temperature sensor disposed within the cavity and operatively coupled to the feed wire, the temperature sensor configured to provide temperature data to the central controller.

8. The heated filter shell assembly of claim 1, further comprising an electronics package operatively coupled to the heating element and the feed wire, the electronics package configured to regulate the thermal output of the heating element.

9. The heated filter shell assembly of claim 8, further comprising a temperature sensor exposed to the cavity and operatively coupled to the electronics package, wherein the electronics package is further configured to receive temperature data from the temperature sensor and adjust the thermal output of the heating element based on the temperature data.

10. The heated filter shell assembly of claim 2, wherein the heating element is disposed adjacent to a center point at the second end of the filter shell.

11. The heated filter shell assembly of claim 10, further comprising a locking fastener engaged to a locking portion disposed toward the feed wire first end, wherein the engagement of the locking fastener to the locking portion secures the coupling of the heating element to the filter shell.

12. The heated filter shell assembly of claim 11, wherein the locking fastener comprises a permanent fastener.

13. A heated filter shell assembly for a fuel filtration system, the heated filter shell assembly comprising:
a filter shell defining a cavity sized to accommodate at least a portion of a fluid filtration cartridge and a cartridge receiving aperture at a first end;
a heating element disposed within the cavity and operatively coupled to the filter shell adjacent to a second end of the filter shell;
a feed wire operatively coupled to the heating element at a feed wire first end and configured for electrical energy receiving communication with an energy source at a feed wire second end;
a locking fastener engaged to a locking portion disposed toward the feed wire first end, wherein the engagement of the locking fastener to the locking portion secures the coupling of the heating element to the filter shell; and
at least one pin operatively coupling the heating element to the filter shell, the at least one pin positioning the heating element at a central position in the filter shell prior to the engagement of the locking fastener to the locking portion,
wherein the heating element comprises a plurality of heating elements; and
wherein the fluid filtration cartridge is positioned above the heating element within the cavity, and
wherein the heating element is disposed adjacent to a center point at the second end of the filter shell.

14. The heated filter shell assembly of claim 13, wherein thermal output of the heating element is regulated by a central controller of an associated internal combustion engine.

15. The heated filter shell assembly of claim 14, wherein a temperature sensor is disposed within the cavity and operatively coupled to the feed wire, the temperature sensor configured to provide temperature data to the central controller.

16. The heated filter shell assembly of claim 13, further comprising an electronics package operatively coupled to the heating element and the feed wire, the electronics package configured to regulate the thermal output of the heating element.

17. The heated filter shell assembly of claim 14, further comprising a temperature sensor exposed to the cavity and operatively coupled to the electronics package, wherein the electronics package is further configured to receive temperature data from the temperature sensor and adjust the thermal output of the heating element based on the temperature data.

18. An internal combustion assembly comprising:
a fuel reservoir configured to store a quantity of fuel;
a fuel filtration system in fluid receiving communication with the fuel reservoir and comprising:
a fuel filtration cartridge;
a filter shell defining a cavity configured to receive at least a portion of the fuel filtration cartridge and a cartridge receiving aperture at a first end;
a heating element disposed within the cavity and operatively coupled to a bottom end of the filter shell adjacent to a second end of the filter shell; and
a feed wire operatively coupled to the heating element at a feed wire first end and configured for electrical energy receiving communication with an energy source at a feed wire second end;
an internal combustion engine in fluid receiving communication with the fuel filtration system;
a locking fastener engaged to a locking portion disposed toward the feed wire first end, wherein the engagement of the locking fastener to the locking portion secures the coupling of the heating element to the filter shell; and
at least one pin operatively coupling the heating element to the filter shell, the at least one pin positioning the heating element in the filter shell prior to the engagement of the locking fastener to the locking portion,
wherein the bottom end of the filter shell is between the fluid filtration cartridge and the heating element when the portion of the fluid filtration cartridge is received within the cavity.

19. The internal combustion assembly of claim 18, further comprising a locking fastener engaged to a locking portion disposed toward the feed wire first end, wherein the engagement of the locking fastener to the locking portion secures the coupling of the heating element to the filter shell.

20. An internal combustion assembly comprising:
a fuel reservoir configured to store a quantity of fuel;
a fuel filtration system in fluid receiving communication with the fuel reservoir and comprising:
a fuel filtration cartridge;
a filter shell defining a cavity sized to accommodate at least a portion of the fuel filtration cartridge and a cartridge receiving aperture at a first end;
a heating element disposed within the cavity and operatively coupled to the filter shell adjacent to a second end of the filter shell; and
a feed wire operatively coupled to the heating element at a feed wire first end and configured for electrical energy receiving communication with an energy source at a feed wire second end;
an internal combustion engine in fluid receiving communication with the fuel filtration system;
a locking fastener engaged to a locking portion disposed toward the feed wire first end, wherein the engagement of the locking fastener to the locking portion secures the coupling of the heating element to the filter shell; and
at least one pin operatively coupling the heating element to the filter shell, the at least one pin positioning the heating element at a central position in the filter shell prior to the engagement of the locking fastener to the locking portion,
wherein the fluid filtration cartridge is positioned above the heating element within the cavity.

21. The internal combustion assembly of claim 18, wherein thermal output of the heating element is regulated by a central controller of the internal combustion engine.

22. The internal combustion assembly of claim 21, further comprising a temperature sensor disposed within the cavity and operatively coupled to the feed wire, the temperature sensor configured to provide temperature data to the central controller.

23. The internal combustion assembly of claim 18, further comprising an electronics package operatively coupled to the heating element and the feed wire, the electronics package configured to regulate the thermal output of the heating element.

24. The internal combustion assembly of claim 23, further comprising a temperature sensor exposed to the cavity and operatively coupled to the electronics package, wherein the electronics package is further configured to receive temperature data from the temperature sensor and adjust the thermal output of the heating element based on the temperature data.

25. A fuel filtration system in fluid communication with a fuel reservoir, comprising:
- a fuel filtration cartridge;
- a filter shell defining a cavity configured to receive at least a portion of the fuel filtration cartridge and a cartridge receiving aperture at a first end;
- a heating element disposed within the cavity and operatively coupled to a bottom end of the filter shell adjacent to a second end of the filter shell; and
- a feed wire operatively coupled to the heating element at a feed wire first end and configured for electrical energy receiving communication with an energy source at a feed wire second end;
- a locking fastener engaged to a locking portion disposed toward the feed wire first end, wherein the engagement of the locking fastener to the locking portion secures the coupling of the heating element to the filter shell; and
- at least one pin operatively coupling the heating element to the filter shell, the at least one pin positioning the heating element in the filter shell prior to the engagement of the locking fastener to the locking portion,
- wherein the bottom end of the filter shell is between the fluid filtration cartridge and the heating element, when the portion of the fluid filtration cartridge is received within the cavity.

26. The fuel filtration system of claim 25, wherein the heating element comprises a plurality of heating elements.

27. The fuel filtration system of claim 25, wherein the heating element is disposed adjacent to a center point at the second end of the filter shell.

28. A fuel filtration system in fluid communication with a fuel reservoir, comprising:
- a fuel filtration cartridge;
- a filter shell defining a cavity sized to accommodate at least a portion of the fuel filtration cartridge and a cartridge receiving aperture at a first end;
- a heating element disposed within the cavity and operatively coupled to the filter shell adjacent to a second end of the filter shell;
- a feed wire operatively coupled to the heating element at a feed wire first end and configured for electrical energy receiving communication with an energy source at a feed wire second end;
- a locking fastener engaged to a locking portion disposed toward the feed wire first end, wherein the engagement of the locking fastener to the locking portion secures the coupling of the heating element to the filter shell; and
- at least one pin operatively coupling the heating element to the filter shell, the at least one pin positioning the heating element at a central position in the filter shell prior to the engagement of the locking fastener to the locking portion,
- wherein the fluid filtration cartridge is positioned above the heating element within the cavity.

29. The fuel filtration system of claim 25, further comprising an electronics package operatively coupled to the heating element and the feed wire, the electronics package configured to regulate the thermal output of the heating element.

30. The fuel filtration system of claim 29, further comprising a temperature sensor exposed to the cavity and operatively coupled to the electronics package, wherein the electronics package is further configured to receive temperature data from the temperature sensor and adjust the thermal output of the heating element based on the temperature data.

31. A method comprising:
- providing a filter shell, the filter shell defining a cavity configured to receive at least a portion of a filtration cartridge;
- securing a feed wire to the filter shell, wherein the feed wire passes through an aperture in the filter shell;
- connecting an electronics package to a first end of the feed wire;
- connecting a heating element to the electronics package, wherein the heating element is positioned in the cavity of a bottom end of the filter shell;
- receiving the portion of the filtration cartridge in the cavity such that the bottom end of the filter shell is between the fluid filtration cartridge and the heating element;
- engaging a locking fastener to a locking portion disposed toward the feed wire first end, wherein the engagement of the locking fastener to the locking portion secures the coupling of the heating element to the filter shell; and
- operatively coupling at least one pin to the heating element to the filter shell, the at least one pin positioning the heating element in the filter shell prior to the engagement of the locking fastener to the locking portion.

32. The method of claim 31, further comprising adjusting a position of the heating element within the cavity of the filter shell.

33. The method of claim 31, further comprising installing the filter shell onto a filtration system.

34. The method of claim 33, further comprising filtering a fluid through the filtration cartridge.

35. The method of claim 33, further comprising heating a fluid passing through the filter shell by the heating element.

36. The method of claim 31, further comprising connecting a power source to a second end of the feed wire.

* * * * *